UNITED STATES PATENT OFFICE.

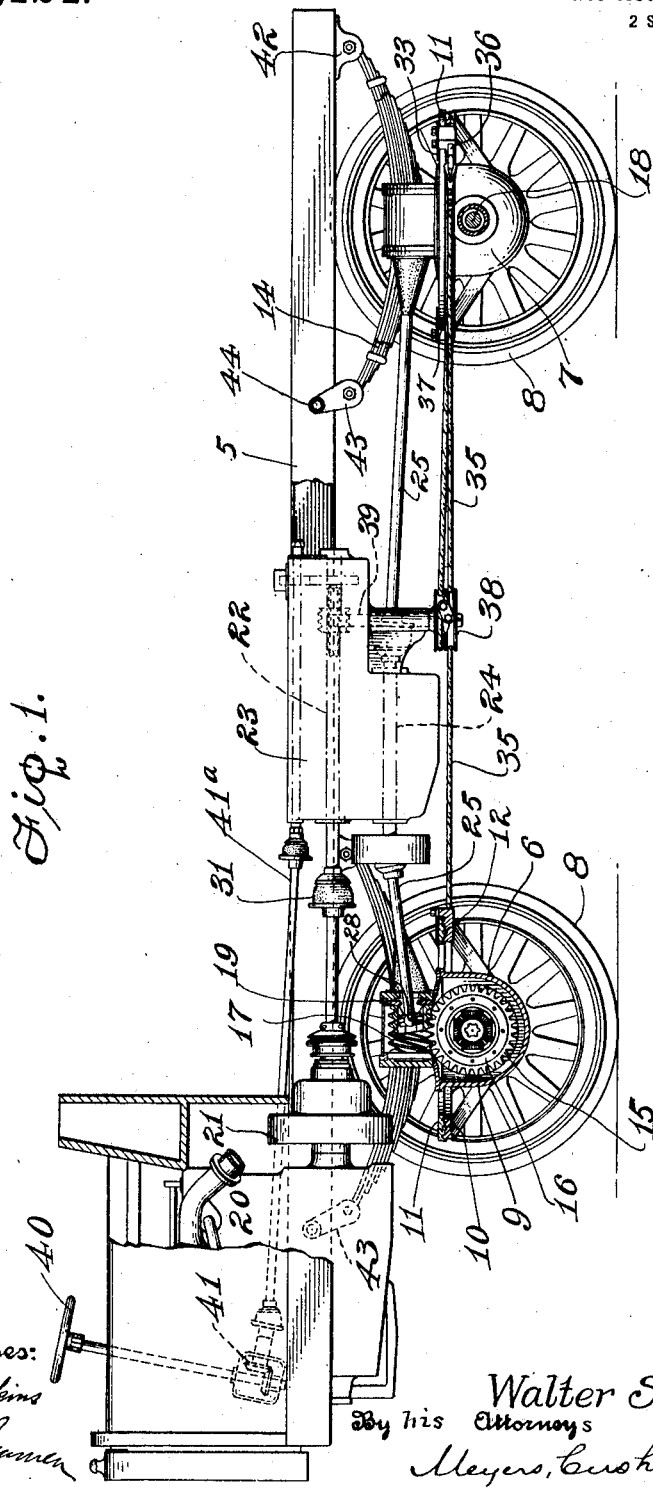

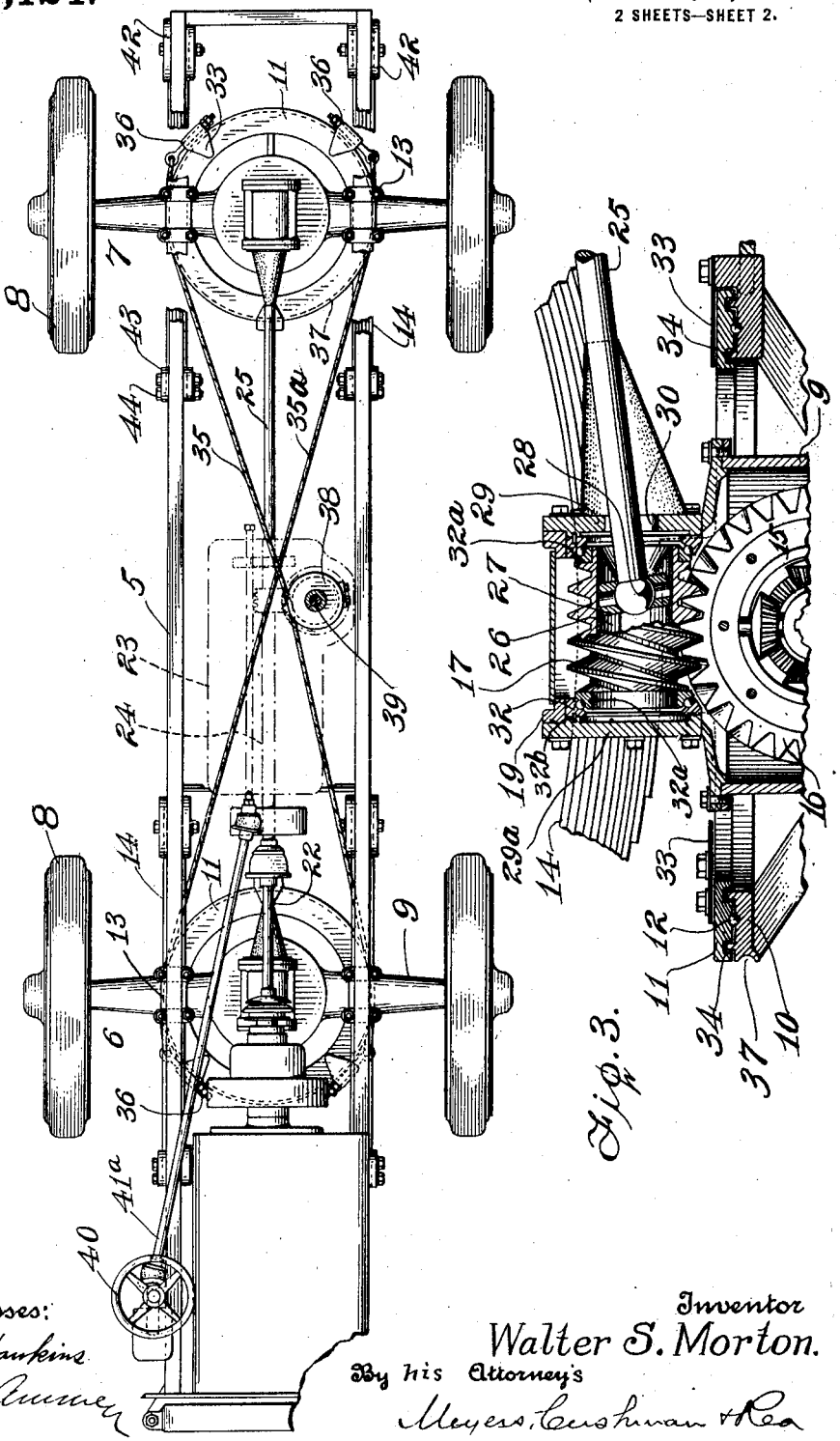

WALTER S. MORTON, OF HARRISBURG, PENNSYLVANIA.

MOTOR-TRUCK CONSTRUCTION AND DRIVE.

1,339,124.  Specification of Letters Patent.  Patented May 4, 1920.

Application filed October 30, 1915. Serial No. 58,824.

*To all whom it may concern:*

Be it known that I, WALTER S. MORTON, a citizen of the United States, residing at Harrisburg, in the county of Dauphin and State of Pennsylvania, have invented new and useful Improvements in Motor-Truck Construction and Drive, of which the following is a specification.

My invention relates to motor-trucks and their driving mechanism, and particularly to motor-trucks of a heavy type in which a driving connection is maintained to each wheel.

A principal object of the invention is to produce a motor-truck construction and drive in which the front and rear axle may swing in a substantially horizontal plane in steering the truck and in which an effective driving connection is maintained from the motor to the wheels in any position that the axles may assume in steering the truck.

A further object of the invention is to provide in such a construction improved means for connecting the axle with the frame and for driving the same from the motor.

A further object of the invention is to provide a motor-truck, all of the wheels of which may be moved in steering the vehicle and in which a driving connection is maintained to all the wheels in any steering position of the axles.

Further objects of the invention will appear hereinafter.

The invention consists in the general combination of parts and details described hereinafter, all of which contribute to produce an efficient motor-truck construction and drive.

A preferred embodiment of the invention is described fully in the following specification while the broad scope of the invention is pointed out in the appended claims.

In the drawing,

Figure 1 is a side elevation and partial section of a motor-truck embodying my invention.

Fig. 2 is a plan, partially broken away, of the truck shown in Fig. 1.

Fig. 3 is a vertical section upon an enlarged scale showing details of the construction where the axle is connected with the springs, and also illustrating details of the driving connection to the wheels.

The truck which I have illustrated comprises a frame 5 supported upon a front axle 6 and a rear axle 7, each of said axles being provided with two wheels 8 which support the truck. The front and rear axles are substantially the same in construction and I have illustrated, by way of example, the forward axle 6 more in detail than the rear axle.

In the present embodiment, each axle comprises a housing 9 which supports the frame in such a way that the axle-housing can swing as on a pivot on the frame, so that each axle in steering the truck may swing in a front-and-rear direction, that is, in a substantially horizontal plane.

In order to effect this, I prefer to provide each axle-housing 9 with a fifth-wheel member 10 which is located so that the central vertical axis of the fifth-wheel member passes through the middle point of the axle, and on the upper side of this fifth-wheel member 10 I provide an upper fifth-wheel member 11, the space between the said fifth-wheel members being formed into a ball-race and provided with balls 12 so that the fifth-wheel substantially constitutes a ball-bearing.

The upper fifth-wheel member 11 is attached by suitable clips 13 to springs such as the side springs 14 of the laminated or carriage-spring type, the ends of said springs being connected to the frame. The middle portion of each axle-housing 9 is preferably enlarged to receive a differential gearing or differential 15 and this differential preferably includes a worm wheel 16 which is driven by power so as to impart its movement to the wheels carried by its corresponding axle 18.

In order to drive this gear wheel such as the wheel 16, I prefer to provide a driving gear preferably in the form of a worm 17 disposed over each axle and this worm meshes with the worm wheel 16 so that when the worm wheel is rotated its rotation is imparted to the shaft or shafts 18 which carry the wheels 8, and each of these worms 17 is suitably mounted in a gear casing or case 19 attached to and virtually forming the upper wall of the axle-housing at its middle point.

By way of example, I have illustrated the motor 20 as located on the forward end of the frame, and arranged so that its shaft rotates a fly-wheel 21 from which the shaft 22 extends back to a transmission case 23 inclosing suitable transmission mechanism for driving a counter shaft 24. From this counter shaft 24 I prefer to drive the worms 17 and this is preferably effected through the medium of inclined driving shafts 25 which have flexible driving connections with the worms 17, which permit the shaft 25 to rotate the worms in any steering position the axles may assume. This flexible driving connection is preferably effected by constructing the worm so that it is hollow, that is, so that it presents an enlarged bore with two diametrically opposite slots 26; these slots receive rollers 27 attached to pins projecting from opposite sides of a driving crosshead 28, formed on the end of the shaft. These details are illustrated most clearly in Fig. 3.

The gear case 19 comprises a cover plate 29 which has an enlarged central opening 30 through which the driving shaft 25 passes, and this permits a limited but sufficient swinging movement of the axle in a horizontal plane, at the same time permitting more or less of a sliding movement, when necessary, of the crosshead 28 along the interior of the worm. When a relative up-and-down movement of the frame on the wheels occurs, as may occur when the truck passes over a rough roadway, such a sliding movement evidently will occur on account of the fact that the driving shafts 25 are slightly inclined in a vertical plane, see Fig. 1. Although evidently there are no thrust forces in the driving shafts 25, if constructed as described, and driven through suitable flexible connections 31 from the shaft 22, it is necessary, however, to provide for a thrust in the worm 17, and for this purpose I prefer to provide ball-bearing rings 32 for each worm at the ends of its gear case 19. And the worms have complementary ball rings 32ª coöperating with the rings 32 to form ball races.

As will be seen, the length of the gear case or driving gear housing 19 is not greater—it is shown as less—than the similar length of axle housing 9, the driving gear 17 being housed within this housing 19. As a result, the drive connections and their housings are complete and adapted for efficient operation and at the same time occupy a minimum amount of space. Consequently, the truck motor can be mounted at the front end of the frame at its most advantageous point where the general structure is such as to provide for a low hanging frame, the compact form of housing and drive connections leaving the necessary space to permit the connections between the motor and the specific drive structure to be readily located within the unoccupied space of the low hanging frame and without affecting the freedom of steering operation in a truck of this type.

In order to overcome any tendency of the upper fifth-wheel member 11 to become unseated from the lower fifth-wheel member, I prefer to provide keepers in the form of plates 33 which project over the upper fifth-wheel member, see Fig. 3, and furthermore, the fifth-wheel members are preferably provided with interlocking annular tongue-and-groove connections 34.

Any suitable means may be provided for swinging the axles on their fifth-wheels. In the present embodiment, I have illustrated a cable arrangement, comprising two crossed cables, a relatively fixed cable 35ª, and a take-up cable 35, the ends of the said cables being anchored as at 36 in the lower fifth-wheel members, which have grooves 37 to guide and receive the cables. The cables pass around and are attached to a steering sheave 38 which may be attached to the lower end of a vertical steering spindle 39 and this spindle is controlled in any suitable manner from a steering wheel 40, through gearing 41, and through the medium of a shaft 41ª leading to the transmission case 23.

The springs 14 are preferably pivoted at their rear ends in brackets 42 on the frame, and at the forward ends are suspended on shackle plates or shackles 43 which are pivotally supported on the frame as at 44.

The ball-rings 32 are preferably held against turning by dowel pins 32ᵇ which extend into the end plates 29 and 29ª of the case.

In the operation of this motor-truck, evidently, the axles can be readily swung to oppositely inclined positions simultaneously by means of the steering wheel 40 and though the axles may become inclined as suggested, an effective driving connection will still be maintained by the driving shafts 25 through the worm 17 to drive the wheels, any changes in the relative position of the driving crosshead 28 and the worm being compensated for by the free longitudinal sliding movement of the crosshead which occurs by virtue of the slots 26 and rollers 27; evidently also any up-and-down movement of the frame on the axles due to the load on the frame or due to the movements of the frame on the springs in passing over a rough roadway, is also compensated for by the driving connections at the crossheads 28, for obviously the crossheads may move farther in or out in the worms, depending upon the relative position of the transmission case 23 and the worms.

Special attention is called to the driving connection from the driving shafts 25 to the front and rear axles. In this construction I place each driving gear or worm 17 directly over the axis about which the axle swings in a front and rear direction in steering the vehicle. This feature and the flexible connection with each worm enables the driving connection to all the wheels to operate continuously in any position the axles may assume in steering the truck.

On account of the fact that the shackles 43 are attached to corresponding ends of the springs 44, it is evident that under a heavy load the axles 18 and 19 both tend to move slightly forward with relation to the frame; and this displacement is substantially the same in amount at both axles. Hence, it does not change the distance between the anchored points of the fixed cable 35ª. As regards the cable 35, slack will be given to one end while slack will be taken up by the other; this can be immediately corrected by a slight rotation of the steering spindle 39.

It is understood that the embodiment of the invention set forth herein is only one of the many embodiments or forms the invention may take, and I do not wish to be limited in the practice of the invention nor in my claims to the particular embodiment set forth. And I may use any feature of my invention without the other features.

What I claim is:

1. In a motor-truck, in combination, wheels and a pair of axles supported by said wheels, each of said axles including an axle-housing and a shaft within the same for driving the wheels, a fifth-wheel member carried by each axle-housing, an upper fifth-wheel member seating upon the same, a frame, springs connecting said frame with said upper fifth-wheel members, said fifth-wheel members permitting a swinging movement of each axle about its middle point in a substantially horizontal plane to steer the vehicle, a gear casing attached to the upper portion of each axle-housing and constituting a top wall therefor, a worm rotatably mounted in each gear casing above the adjacent fifth wheel and over the center of the adjacent axle, a differential in each axle-housing driven by its corresponding worm and driving the shaft of that axle to drive both wheels on that axle, a motor supported on said frame, and driving shafts driven by said motor and having flexible driving connections with said worms respectively to drive the same in any position the axles may assume in steering the truck.

2. In a motor-truck, in combination, wheels and a pair of axles supported by said wheels, each of said axles including an axle-housing and a shaft within the same for driving the wheels, a frame pivotally supported on each axle-housing to permit a swinging movement of each axle in a substantially horizontal plane in steering the truck, a gear casing surmounting the said axle-housing and having a length not greater than the similar length of the axle-housing, a worm within each gear casing connected with the wheels of its corresponding axle to drive the same, said worm being located above the middle portion of such axle, a motor supported on said frame and driving shafts driven by said motor and having flexible connections with said worm to drive the same in any position said axles may assume in steering the vehicle.

3. In a motor-truck, in combination, wheels and a pair of axles supported by said wheels, a frame pivotally supported on each axle by a fifth-wheel structure to permit a swinging movement of each axle in a substantially horizontal plane in steering the truck, a gear over the middle portion of each axle for driving the wheels corresponding to that axle, means for supporting said gear by engaging opposite sides thereof, a shaft supported on the frame between the two axles, inextensible driving shafts driven by said last named shaft, and flexible sliding driving connections between said driving shafts and said gears to enable the wheels to be driven in any positions the axles may assume in steering the truck.

4. In a motor-truck, in combination, a frame, wheels and a pair of axles supported by said wheels, each axle including a housing and a shaft within the same, a fifth-wheel carried by each axle for supporting said frame and permitting a swinging movement of each axle at its middle point in a substantially horizontal plane to steer the vehicle, a motor supported on said frame, a gear case surmounting the housing of each axle, a differential within each axle, a worm in said gear case located above the middle point of the axle engaging with said differential to drive the same, each gear case having a ball-ring at each end of the worm, each worm having complementary ball-rings cooperating with said first named ball-rings to form a ball-race at each end of the worm, balls in said ball-race, and a flexible connection from the motor to each worm.

5. In a motor truck, in combination, a frame, bow springs under said frame pivotally attached at corresponding ends of said springs to said frame, shackles connecting the other corresponding ends of said springs to said frame, axles attached to said springs for supporting the frame, a motor supported on said frame, differentials within said axles, fifth-wheels connecting said axles with said springs and permitting a forward and rear swinging movement of said axles in steering, means including worm gears located above the fifth wheel and above the central points of the axle for driving said differentials from said motor in any position of said axles, crossed steering cables connecting said fifth-wheels, and means for actuating one of said cables to swing the axles to steer the truck.

6. In a motor-truck, in combination, a frame, axles supporting said frame by a fifth wheel connection, each of said axles being mounted to swing about an axis in a front and rear direction in steering the vehicle, a driving gear over the said axis of said axle, means for supporting said gear by engaging opposite ends thereof, transmission mechanism supported on said frame, means for driving each of said driving gears from said transmission mechanism in any position the axles may assume, said means including a flexible engagement with said gear.

7. In a motor-truck, in combination, a frame, axles supporting said frame by a fifth-wheel connection, each axle mounted to swing in a front and rear direction about an axis in steering the vehicle, a worm over the said axis of each axle, wheels carried by each axle, differential mechanism on each axle for driving the wheels and driven by the worm corresponding to that axle, a motor, and a flexible connection at each of said worms for driving the wheels from said motor in any position the axles may assume in steering the truck.

8. In a motor truck and in combination, a frame and its wheeled supporting axles, and driving means for the truck including an axle mounted to permit the axle to swing about an axis and in a front to rear direction in steering the truck, an axle-housing, a gear therein, a drive-gear housing surmounting the axle housing over said axis of the axle and having a length less than the similar length of the axle-housing, a driving gear housed within the driving gear housing, and operating connections between the truck motor and the driving gear, said connections including means located within said drive gear housing for compensating for housing movements under steering action.

In testimony whereof I have hereunto set my hand in presence of two subscribing witnesses.

WALTER S. MORTON.

Witnesses:
A. C. WHALEN,
ROBT. L. MORTON.